P. DAIMLER.
LUBRICATING DEVICE.
APPLICATION FILED AUG. 10, 1916.
1,269,582.
Patented June 18, 1918.
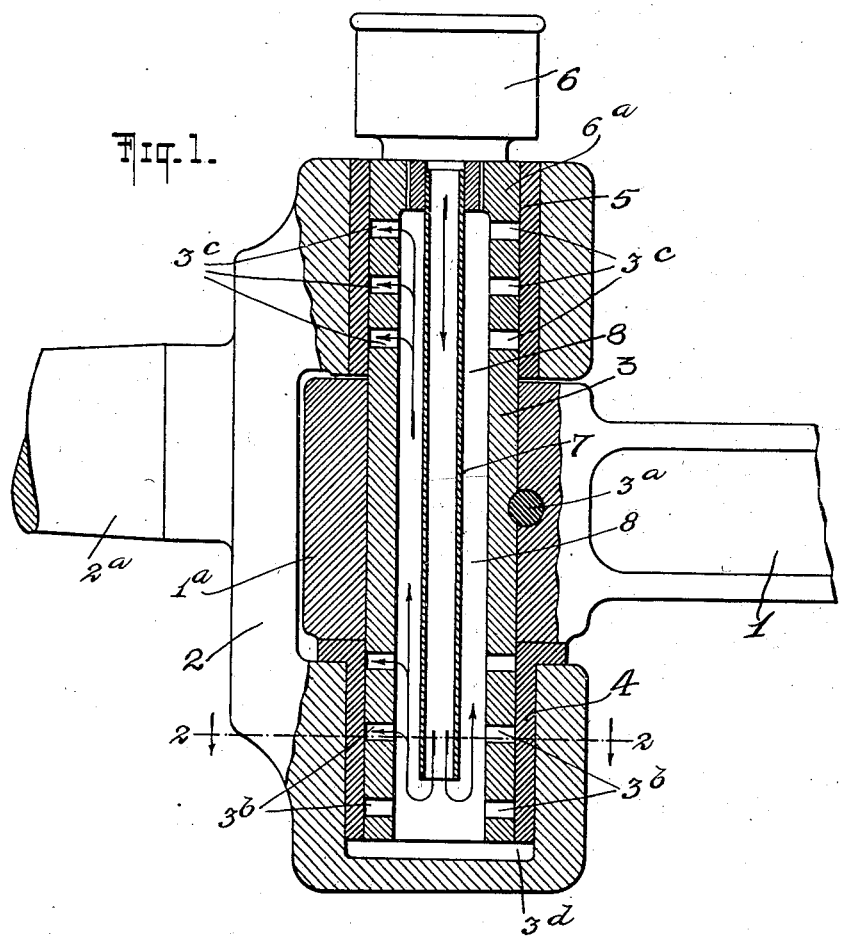
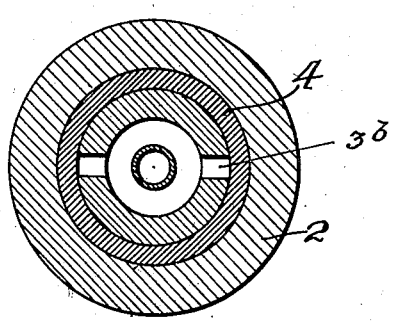
WITNESSES
INVENTOR
PAUL DAIMLER
BY
ATTORNEYS

UNITED STATES PATENT OFFICE.

PAUL DAIMLER, OF CANNSTATT, GERMANY, ASSIGNOR TO DAIMLER-MOTOREN-GESELL-SCHAFT, OF STUTTGART-UNTERTÜRKHEIM, GERMANY, A CORPORATION OF GERMANY.

LUBRICATING DEVICE.

1,269,582.

Specification of Letters Patent.  Patented June 18, 1918.

Application filed August 10, 1916. Serial No. 114,155.

*To all whom it may concern:*

Be it known that I, PAUL DAIMLER, a citizen of the German Empire, and a resident of Cannstatt, Germany, have invented new and useful Improvements in Lubricating Devices, of which the following is a specification.

My invention relates to lubricating devices and more particularly to devices intended for lubricating the steering knuckles of self-propelled vehicles such as automobiles.

In such constructions the steering spindles are usually journaled on spindle pins, the active bearing surfaces of each steering knuckle being usually spaced apart and generally arranged substantially one at a distance above the other and the lubricant employed is usually of a viscous nature and in the form of a grease. This lubricant is, generally speaking, squeezed or forced from a grease cup into a hollow spindle pin and then conducted to the bearing surfaces, this being continued until the lubricant oozes out at the bearing surfaces, which is taken as an indication that the desired distribution of the lubricant has been effected and that the flow of the lubricant may be cut off. With such arrangements usually only one bearing surface of each steering knuckle is under observation during the lubricating process, this being generally the one which is most readily visible and in close proximity to which the grease cup is also generally located on account of the necessity for ready accessibility to said cup. These constructions possess the serious disadvantage that while a sufficient amount of lubricant will be conducted to that bearing surface which is readily visible, the coöperating bearing surface which is located at a distance from the first and from the grease cup will ofttimes not be efficiently lubricated at the time the lubricant oozes out at the visible bearing surface and will thus quickly become worn and unsatisfactory.

The present invention has for its principal object to provide a simple arrangement whereby the above objections will be fully overcome and whereby the oozing out of the lubricant at those bearing surfaces which are readily visible for observation purposes may be taken as a positive indication that all bearing surfaces of the particular steering knuckle have been efficiently lubricated.

My invention will be fully described hereinafter and the features of novelty will be pointed out in the appended claims.

An example of my invention is illustrated in the accompanying drawings in which Figure 1 is a vertical section of a steering knuckle including my improved construction and Fig. 2 is a horizontal section thereof on the line 2—2 of Fig. 1.

Referring to the drawing, 1 represents an axle of the type commonly used in motor vehicles, which at the free end shown is provided with a rigid head 1ª in which a hollow spindle pin 3 is fixed in any suitable manner as for instance by means of a key, wedge or the like 3ª. The said spindle 3 extends transversely through the head 1ª in a vertical direction and is open at its lower end while its upper end is closed by a transverse wall 6ª, a grease cup 6 being located at said upper end of the spindle pin and preferably screwed into said end wall or comprising an integral part thereof although this latter is not absolutely necessary. Said spindle pin 3 at points above and below the head 1ª is provided with openings 3ᵇ and 3ᶜ which extend transversely through said spindle pin and are located opposite bearing rings 4 and 5, the latter being rotatable about said spindle pin 3 as is clearly shown in Fig. 1. These bearing rings 4 and 5 are rigidly carried by the spindle yoke 2 and support the steering spindle 2ª, the latter being preferably formed as an integral part of the yoke 2 and serving in the customary way as an axle upon which the usual steerable wheel is rotatably mounted. It will be seen that the yoke 2 is closed at the bottom and is preferably so arranged as to form a closed chamber 3ᵈ opposite to the open lower end of the spindle pin 3 as shown in Fig. 1. A tube 7 has its one end fixed in the transverse wall 6ª and depends therefrom into the hollow spindle pin 3, the lower end of said tube 7 being located near the lower end of said spindle pin and in proximity to the transverse openings 3ᵇ as shown in Fig. 1. This tube establishes communication between the interiors of the grease cup 6 and the spindle pin 3 and owing to its smaller diameter forms with said spindle pin an annular space 8 which extends substantially the entire length of said pin 3.

In operation the grease or other lubricant is pressed or otherwise discharged from the grease cup 6 into the tube 7 and passes or flows downwardly through the same into the chamber 3ᵈ from which it gradually rises in the annular space 8 between the tube 7 and the inner surface of the spindle 3 as indicated by the arrows in Fig. 1. As the said lubricant or grease in thus rising reaches the lower transverse openings 3ᵇ it will pass through the same into contact with the inner surface of the bearing ring 4 and as the rising of the grease or lubricant in said annular space 8 continues due to the continued discharge from the grease cup 6, the upper transverse openings 3ᶜ will be reached and the grease or other lubricant will finally pass through the same into contact with the inner surface of the bearing ring 5. As soon as the grease or other lubricant begins to ooze out at the bearing ring 5 the attendant may be absolutely certain that proper and sufficient lubricant has been conducted to both bearing surfaces or rings 4 and 5 and the discharge from the grease cup 6 may accordingly be cut off until such time as lubrication is again needed whereupon the above operation may be repeated.

With my improved arrangement the grease or other lubricant is thus conducted first to the bearing surface which on account of its unfavorable location or for other reasons is not readily visible for observation purposes and is then conducted to the coöperating bearing surface which on account of its position may be readily observed by the attendant. This is in contradistinction to existing constructions in which the lubricant is conducted first to the bearing surface which is readily visible and which ofttimes is located in close proximity to the source of supply of the lubricant and then to the bearing surface which cannot be readily observed and which is usually at a distance from the grease cup or the like from which the lubricant is received. This latter bearing surface is thus ofttimes inefficiently lubricated for the reason that the flow of lubricant is usually cut off as soon as the lubricant is seen to be oozing out at the visible bearing surface and as at such time sufficient lubricant may not have reached the second bearing surface the latter as before stated ofttimes suffers from lack of lubrication and thus quickly wears out. With lubrication arrangements of the type in question a different degree of resistance to the outflow of the lubricant is also ofttimes present at the two bearing surfaces of each steering knuckle. This is so in existing motor vehicle constructions in which the ends of the axles carrying the spindle pins bear upon the lower bearing surfaces, under the weight of the vehicle whereby the passage or flow of the lubricant in an upward direction is retarded, while the bearing ring of the lower bearing surface is closed toward the bottom by the spindle yoke of the wheel spindle, which covers said bearing ring from below. In order to obtain satisfactory and efficient lubrication in such cases notice must be taken of such difference in the degree of resistance. In other words to provide for an efficient lubrication of all of the bearing surfaces the lubricant must be conducted first to that surface at which the greatest resistance to the flow thereof takes place and then to the surface at which the degree of resistance is less. Thus as soon as the lubricant begins to ooze out at the latter bearing surface, it may safely be taken for granted that all the coöperating bearing surfaces have been properly and efficiently lubricated. This result is attained in a simple and extremely satisfactory manner in the present improvement in which the lubricant is first fed to the lower bearing ring 4 at which the greatest degree of resistance to the outflow would take place and then conducted to the bearing ring 5 at which a lesser degree of resistance to said outflow is present.

If the lubricant on the other hand is fed first to the bearing surface at which the lowest degree of resistance to the outflow is interposed and then to the bearing surface at which the highest degree of resistance takes place and the latter is utilized as an observation point to determine when proper lubrication has been had it will be found, in all cases before the lubricant has overcome this higher resistance, if this result is at all possible, and begins to ooze out at said bearing surface, that considerable lubricant has been wasted and lost by flowing out at the bearing surface at which the lower degree of resistance is interposed. This objection and disadvantage is thus also entirely avoided in the present improvement which is simple in construction and efficient in operation and which may readily be combined with existing constructions of steering knuckles at a minimum of expense and difficulty.

Various changes in the specific construction shown and described may be made within the scope of the claims without departing from the spirit of my invention.

I claim:—

1. In a device of the character described, the combination of two bearing surfaces spaced apart in a vertical direction and means for conducting a lubricant first to the lower surface and then to the upper surface.

2. In a device of the character described the combination of two bearing surfaces, one of which is readily visible and the other of which is spaced therefrom and means for conducting a lubricant first to the latter bearing surface and then to the former readily visible surface.

3. In a device of the character described the combination of two bearing surfaces at each of which a different degree of resistance to the outflow of a lubricant is interposed and means for conducting the lubricant first to the surface at which the greater degree of resistance is present and then to the surface at which the lesser degree of resistance is interposed.

4. In a device of the character described the combination of a pivot spindle, a receptacle for a lubricant at one end of said spindle, spaced bearing members journaled on said spindle and located respectively in proximity to said receptacle and at a distance therefrom and a tube connected with said receptacle and terminating in proximity to the bearing member located at a distance therefrom whereby the lubricant is first conducted to this bearing member and then to the bearing member located in proximity to said lubricating receptacle.

5. In a device of the kind described the combination of a hollow pivot spindle provided with transverse openings near its opposite ends, a grease cup located at the upper end of said spindle, upper and lower spaced bearing members journaled on said spindle opposite said transverse openings, and a tube connected with said grease cup and extending lengthwise within said spindle and terminating at the lower bearing member, whereby the lubricant is first conducted through the lower transverse openings to the lower bearing member, said tube and said spindle forming an annular space in which the lubricant rises to the upper transverse openings and to the upper bearing member.

6. The combination of an axle having an apertured head, a hollow spindle fixed in said head and extending transversely therethrough in a vertical direction, said spindle being provided with transverse openings near its opposite ends, upper and lower bearing rings journaled on said spindle and located respectively above and below said head and opposite said transverse openings, a yoke rigidly carried by said rings, a wheel spindle projecting from said yoke, a grease cup located at the upper end of said hollow spindle and a tube connected with said grease cup and depending therefrom within said hollow spindle and forming therewith an annular space, whereby a lubricant is first conducted to the lower transverse openings and to the lower bearing ring and then rises in said annular space to the upper transverse openings and upper bearing ring.

7. In a device of the character described, the combination of a source of lubrication, a first bearing surface located in close proximity to said source of lubrication, a second bearing surface located at a distance therefrom and means connected directly with said source of lubrication for conducting the lubricant from said source first to the distant bearing surface and then back toward the source and the first bearing surface.

8. The combination of a head, a tubular pivot spindle extending through said head and fixed therein, spaced bearing members journaled on said spindle at opposite sides of said head, and means extending into said spindle for conducting a lubricant from its starting point first to the bearing surface farthest therefrom and then back to the bearing member nearest to said point.

9. The combination of a pair of bearing members spaced from each other, a tubular member having its opposite end portions located within said bearing members and communicating therewith, and means whereby a lubricant is conducted to one end of said tubular member and backward therein toward the source of lubricant, whereby the bearing member farthest removed from said source is first lubricated and then the bearing member nearest to said source.

10. The combination of a pair of bearing surfaces spaced from each other in an axial direction and means for conducting a lubricant first in a direction away from the source of lubricant to one bearing surface and then in the reverse direction toward said source to the other bearing surface.

In testimony whereof I have hereunto set my hand.

PAUL DAIMLER.